United States Patent [19]
Pratt

[11] Patent Number: 5,941,539
[45] Date of Patent: Aug. 24, 1999

[54] FASTENER SYSTEM WITH EXPANDABLE NUT BODY

[75] Inventor: John D. Pratt, Laguna Niguel, Calif.

[73] Assignee: Textron, Inc., Providence, R.I.

[21] Appl. No.: 08/703,012

[22] Filed: Aug. 26, 1996

Related U.S. Application Data

[63] Continuation-in-part of application No. 08/614,741, Mar. 13, 1996, Pat. No. 5,884,923.

[51] Int. Cl.$^6$ ........................................................ A63C 1/00
[52] U.S. Cl. ..................................... 280/11.27; 280/11.22; 280/11.23
[58] Field of Search .............................. 280/11.22, 11.23, 280/11.27; 301/5.3, 5.7, 35.61, 35.62

[56] References Cited

U.S. PATENT DOCUMENTS

| | | |
|---|---|---|
| 2,207,476 | 4/1940 | Bernstein . |
| 3,348,596 | 10/1967 | Leitner ................. 301/35.62 |
| 3,414,304 | 12/1968 | Miller . |
| 4,445,289 | 5/1984 | Beneteau . |
| 4,909,523 | 3/1990 | Olson . |
| 5,028,058 | 7/1991 | Olson . |
| 5,048,848 | 9/1991 | Olson et al. . |
| 5,068,956 | 12/1991 | Malewicz . |
| 5,092,614 | 3/1992 | Malewicz . |
| 5,190,393 | 3/1993 | Svensson ............................... 403/370 |
| 5,356,209 | 10/1994 | Hill . |
| 5,454,676 | 10/1995 | Conte . |
| 5,480,168 | 1/1996 | Chen ................................... 280/11.22 |
| 5,601,299 | 2/1997 | Yun et al. ............................ 280/11.22 |
| 5,741,019 | 4/1998 | Lu ........................................... 301/5.3 |

FOREIGN PATENT DOCUMENTS

| | | |
|---|---|---|
| 624049 | 5/1949 | United Kingdom . |
| 9426366 | 11/1994 | WIPO . |
| 9503861 | 2/1995 | WIPO . |

*Primary Examiner*—Brian L. Johnson
*Assistant Examiner*—Michael Cuff
*Attorney, Agent, or Firm*—Trexler, Bushnell, Giangiorgi & Blackstone, Ltd.

[57] ABSTRACT

A quick release fastener system which is used as an axle system for efficient and reliable attachment, disengagement and reattachment of a component secured by the fastener system. The axle system of the invention includes a pair of axle assemblies, each having an elongated fastener member having a shank, one end of which having a drive structure, an opposite end of which having a threaded portion. A nut member or expander is engageable with the threaded portion of the corresponding fastener and is adapted for engagement in a bore of a wheel assembly. Nut spreading structures are provided on each nut and each fastener which cause the nut to spread or enlarge when the fastener is engaged therewith and rotated therein. The nut is initially retained on the threaded portion of the fastener with the nut spreading structures disengaged. A spline, key, or equivalent structure is formed in the bore and at least one slot or groove is provided on the nut, which is sized and dimensioned for receiving the spline therein. The slot allows the nut to spread or expand, with the spline engaging the slot preventing the nut from rotating in the bore. Nominal rotation of the fastener relative to the nut, approximately a 90° or a quarter turn, results in engaging the nut spreading structures on the fastener and nut to expand or spread the nut and thereby causing the exterior of the nut to forcibly contact and engage the inside surfaces of the bore.

20 Claims, 10 Drawing Sheets

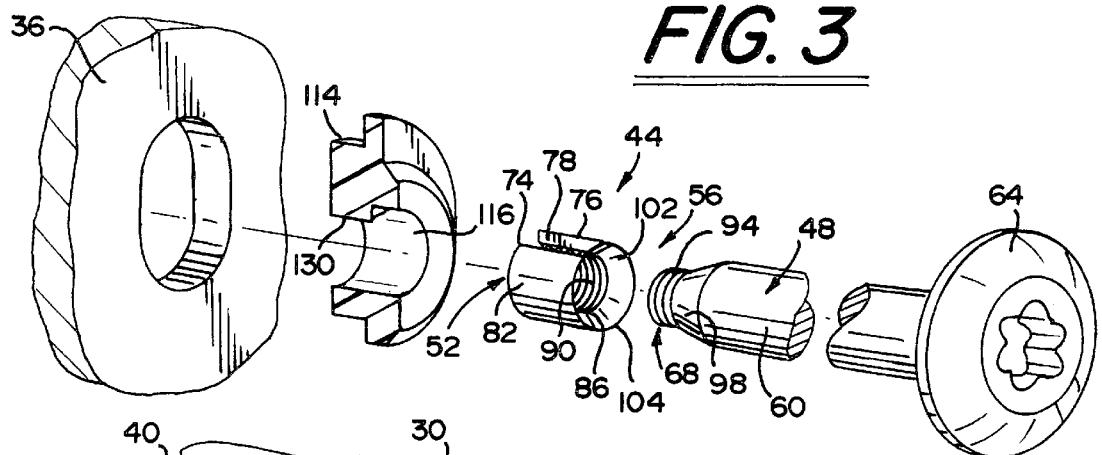
FIG. 3
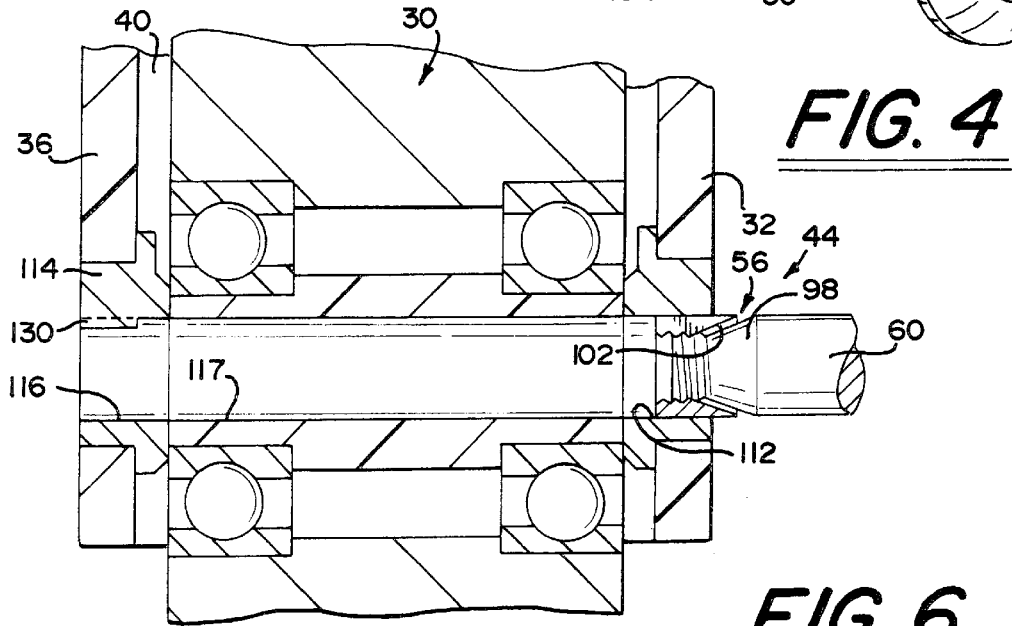
FIG. 4
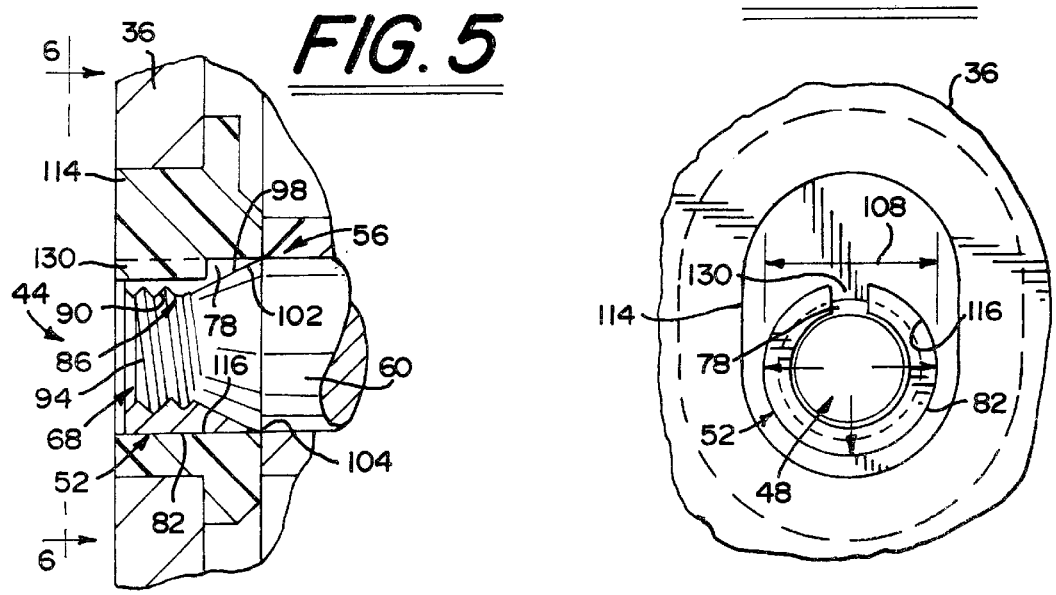
FIG. 5
FIG. 6

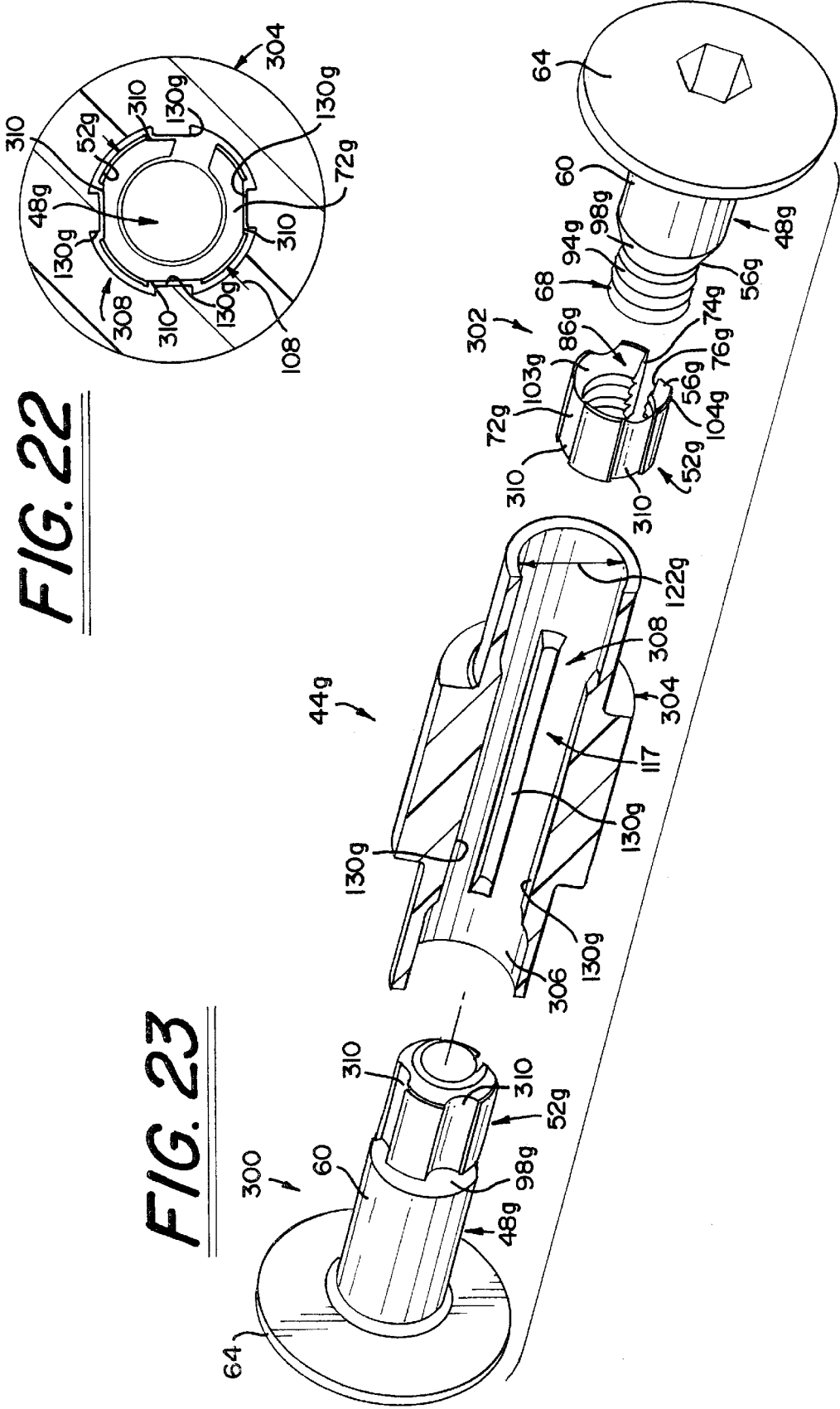

FASTENER SYSTEM WITH EXPANDABLE NUT BODY

CROSS-REFERENCE

The present application is a Continuation-in-Part application U.S. patent application Ser. No. 08/614,741 filed Mar. 13, 1996, now U.S. Pat. No. 5,884,923.

BACKGROUND

This invention is generally directed to a novel quick release and quick attachment fastener system which includes a pair of fasteners and a corresponding pair of expandable nut bodies or expanders engaged with the respective fasteners, wherein the expanders are operated to engage an internal surface of a bore. More particularly, the present invention relates to a fastener system which functions as an axle system for use in quickly and easily removing, attaching, and/or adjusting wheel assemblies used with in-line skates.

A variety of fastener systems which function as axle systems are currently in use for attaching a wheel assembly to an in-line skate chassis. A typical fastener system includes a fastener having a head, a shank, and threaded portion formed on the shank opposite the head. The threaded portion is engageable with a corresponding threaded hex nut. A chassis or frame portion of an in-line skate is provided with structures for retaining a plurality of wheel assemblies in generally linear alignment. Each wheel assembly is retained on the frame by a single fastener which is inserted through one side of the frame and extends through a bore formed therein through a central sleeve bore in the wheel assembly, and through an opposing bore in the frame. The nut is engaged with the threaded portion of the fastener thereby securing the wheel assembly in position relative to the frame.

One of the problems with prior art fastener systems is that it is time consuming to remove the wheel assembly for purposes of repair, replacement or for adjusting the wheels to reconfigure or reposition the wheels of the skates, or for example, to provide a "rockering" effect. While the ordinary skater may not be concerned about the time to replace one or more wheel assemblies, there are many situations in which rapid repair and replacement are important, such as in competitive in-line hockey. Moreover, easy, efficient and reliable removal and replacement of wheels are important for the initial assembly of in-line skates as well as the repair of in-line skates by repair professionals.

Prior art axle fastener systems which use a single fastener extending from one side of the chassis through the wheel assembly to the other side of the chassis are insensitive to the width of the frame or bearing spacer used in these assemblies. In other words, the single axle assembly is attached through the chassis and the wheel with a nut attached to a threaded end thereof. As the nut and axle must be of a specific size in order to retain the wheel relative to the axle, such axles are generally limited to use with specific chassis or frame widths. As such, it would be desirable to have a fastener axle system which can be used with a variety of frame widths.

Increasing popularity of competitive sports which use in-line skates has increased the demand for fast, efficient and reliable removal and replacement of the wheel assemblies. For example, in-line skate hockey is an increasingly popular sport both at the professional level, as well as the amateur level. Further, there are numerous races throughout the country in which in-line skaters race for distance, as well as time. In these applications, fast, efficient and reliable removal and replacement of wheel assemblies is important. Even recreational in-line skaters may need to replace wheel assemblies either for purposes of repairs or for using a different composition of wheel material depending on the surface on which they skate. While speed and efficiency may not be a requirement, it would still be desirable to make the wheel repair or replacement as quick and as easy as possible for the recreational skater.

Ease of use and reliability of a fastener system are also important for recreational, amateur and professional competitors when they desire to reconfigure their in-line skates for such purposes as a "rockering" configuration. Whereas in-line skates typically are configured with the wheels generally abutting or tangent to a common plane or skating surface, a "rockering" configuration moves one or more wheels out of the common plane, thereby providing an approximated curved surface. The rockering configuration is analogous to a hockey skate whereby the blade of the skate is ground with a slight convex arch rather than being a flat blade as generally is used in figure skating. As such, it should be clear, that it would be desirable to quickly and easily reconfigure in-line skate wheel assemblies for such uses.

Another problem with the prior art is that the hardware associated with the fastener system typically is provided in numerous, loose components, including at least the elongated fastener/axle and a separate nut. The fact that these fastener systems involve numerous components which must be separated to remove, attach or adjust the wheels can result in losing a component thereby further increasing the time to effect the operation on a wheel assembly. Because the nut is not captively retained on the fastener/axle, the nut may fall away and become lost thereby requiring the person replacing the wheel assembly to find another nut in order to proceed. The problem is exacerbated by the desirability of having a recessed or protected nut thereby requiring the nut to be positioned in a recessed area to prevent damage to the nut. By recessing the nut, the problem is complicated by the necessity to align the threaded portion of the fastener through the sleeve bore of the wheel and the opposite opening on the opposite portion of the frame.

Examples of prior art fastener systems for use on in-line skates are shown in the following United States patents: U.S. Pat. No. 4,909,523 issued Mar. 20, 1990 to Olson; U.S. Pat. No. 5,028,058, issued Jul. 2, 1991 to Olson; U.S. Pat. No. 5,048,848, issued Sep. 17, 1991 to Olson et al.; U.S. Pat. No. 5,068,956, issued Dec. 3, 1991 to Malewicz; and U.S. Pat. No. 5,092,614, issued Mar. 3, 1992 to Malewicz. The device as shown in Malewicz '956 employs a cap which covers a nut thereby eliminating the need to recess the nut. However, the device in Malewicz '956 still requires numerous rotations of a fastener to securely engage the fastener with the nut. The requirement of numerous rotations of the fastener to engage it securely with a nut is found in each of the references cited hereinabove.

With the foregoing examples of the in-line skate wheel assembly fastener systems in mind, it should be clear that there are many other applications which would benefit from a fastener system or axle system which improves the speed, efficiency and reliability of fastener removal and replacement.

OBJECTS AND SUMMARY

A general object satisfied by the claimed invention is to provide a fastener system for rapid, efficient and reliable fastening and removal of a component retained thereby.

A further object satisfied by the claimed invention is to provide a fastener system which functions as an axle system for use with an in-line skate to retain a wheel assembly thereof in rotary position relative to a frame of the in-line skate.

Yet a further object satisfied by the claimed invention is to provide an axle system and a bearing spacer assembly for rapid, efficient, and reliable fastening and removal of a wheel relative to the frame of an in-line skate.

Still a further object satisfied by the claimed invention is a fastener system which allows for quick adjustment of a wheel assembly in an in-line skate.

Briefly, and in accordance with the foregoing, the present invention envisions a novel quick release fastener system which is used as an axle system for efficient and reliable attachment, disengagement and reattachment of a component secured by the fastener system. The axle system of the invention includes a pair of axle assemblies, each having an elongated fastener member having a shank, one end of which having a drive structure, an opposite end of which having a threaded portion. Each axle assembly also includes a nut member or expander which is engageable with the threaded portion of the corresponding fastener and is adapted for engagement in a bore of a wheel assembly. Nut spreading structures are provided on each nut and each fastener which cause the nut to spread or enlarge when the fastener is engaged therewith and rotated therein. The nut is initially retained on the threaded portion of the fastener with the nut spreading structures disengaged. A spline, key, or equivalent structure is formed in the bore and at least one slot or groove is provided on the nut, which is sized and dimensioned for receiving the spline therein. The slot allows the nut to spread or expand, with the spline engaging the slot preventing the nut from rotating in the bore. Nominal rotation of the fastener relative to the nut, approximately a 90° or a quarter turn, results in engaging the nut spreading structures on the fastener and nut to expand or spread the nut and thereby causing the exterior of the nut to forcibly contact and engage the inside surfaces of the bore. The fastener system is particularly useful in attaching wheel assemblies to an in-line skate and for quick removal or attachment with but a quarter turn of the fastener. More specifically, with regard to an in-line skate apparatus, the pair of elongated fasteners function as axles to hold a wheel assembly in position. As such, a quarter turn of each fastener will release the corresponding nuts from engagement with the wheel assembly. The axle assembly, with the expandable nut attached, can be removed, the wheel replaced and the axle assembly re-inserted and then affixed with a quarter turn of the fastener.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 3 is a partial fragmentary, exploded, perspective view of the novel fastener system of the present invention showing a bushing in cross-section and the nut in perspective to illustrate the relationship between a slot in the nut and a key in the bushing;

FIG. 4 is an illustration similar to that as shown in FIG. 2 in which nut spreading structures on the fastener and the nut are disengaged from the nut and the fastener to be withdrawn from the wheel assembly and the frame;

FIG. 5 is an enlarged view of a portion of the partial fragmentary, cross-sectional view of FIG. 2 showing a threaded portion of the fastener engaged with the nut;

FIG. 6 is an elevational view taken along line 6—6 in FIG. 5 showing the engagement of the nut with the key when the fastener is threadedly engaged with the nut;

FIG. 22 is a partial fragmentary, cross-sectional, side elevational view taken along line 22—22 in FIG. 19 showing the arrangement of the expandable nut body in the bearing spacer having four slots engaged with corresponding splines on the inside surface of the bearing spacer;

FIG. 23 is an exploded perspective view showing the pair of axle assemblies exploded from the bearing spacer and in which one of the axle assemblies has been further exploded to disengage the fastener from the expandable nut body, and further still, in which the bearing spacer shown in a partial fragmentary, cross-sectional view to show splines positioned on an inside surface of the spacer.

DESCRIPTION

Figure 1:
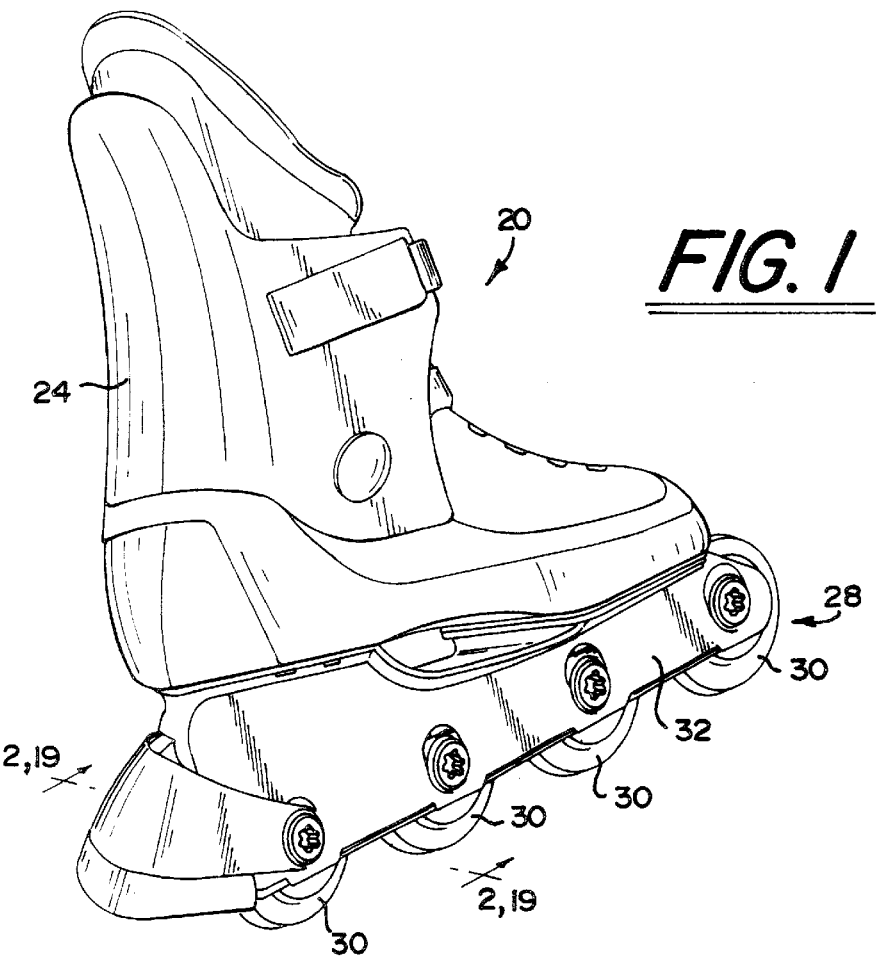
FIG. 1 is a perspective view of a typical in-line skate showing a boot portion, a frame, and a plurality of wheel assemblies attached to the frame.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 shows a single roller skate 20 of the type often referred to as "in-line" roller skates. Each in-line skate 20 includes a boot portion 24 and a wheel frame 28 attached to the boot 24. The wheel frame 28 retains a plurality of wheel assemblies 30 in linear alignment. With further reference to FIGS. 2–7, the wheel frame 28 includes a first side rail 32 and a second side rail 36. The side rails 32, 36 are spaced apart and define a channel 40 therebetween. Each of the wheel assemblies 30 is retained in a desired position in the channel 40 by a fastener/axle system 44.

The fastener/axle system 44 provides an axle and structures for retaining the axle in engagement with the first and second side rails 32, 36. The fastener system 44 includes a fastener 48, an expandable nut body 52 and nut spreading structures 56 on both the fastener 48 and nut body 52. The fastener 48 has a shank 60 with a drive structure 64 on a first end thereof and a threaded portion 68 on an end of the shank 60 opposite the drive structure 64.

The expandable nut body 52 is provided in the form of a single wall structure 72 having two ends 74, 76 which are spaced apart forming a slot 78 therebetween. The wall 72 defines an exterior surface 82 and an interior surface 86. Threads 90 are provided on the interior surface 86 to engage threads 94 on the threaded portion 68 of the fastener 48. The nut 52 is adapted to be disposed in a bore with the exterior surface 82 engaged with the surface portion of the bore.

The nut spreading structures 56 include a tapered surface 98 on the shank 60 of the fastener and a nut tapered surface 102 on a leading end 104 of the nut. The tapered surfaces 98, 102 are brought into close position by threading the fastener 48 into the nut body 52. Continued rotation or engagement of the fastener 48 in the nut 52 will result in engaging the tapered surfaces 98, 102 (see, FIGS. 2 and 5), which will produce a spreading or expanding of the split nut 52.

The nut body 52 has an exterior dimension (as represented by measurement 108 in FIG. 6) which is increased upon continued rotation of the fastener 48 in the nut body 52 after the tapered surfaces 98, 102 make contact. A preferred embodiment of the present invention includes threads 90, 94 which are sized and dimensioned such that a quarter turn, approximately 90° rotation, of the fastener 48 relative to the nut body, once the tapered surfaces 98, 102 are engaged, will result in expanding or spreading the nut body 52. The expansion mechanism of the nut spreading structures 56 and the forces created thereby provide secure attachment of the fastener/axle system 44 for use in an article such as the skate 20 shown in FIG. 1.

Figure 2:
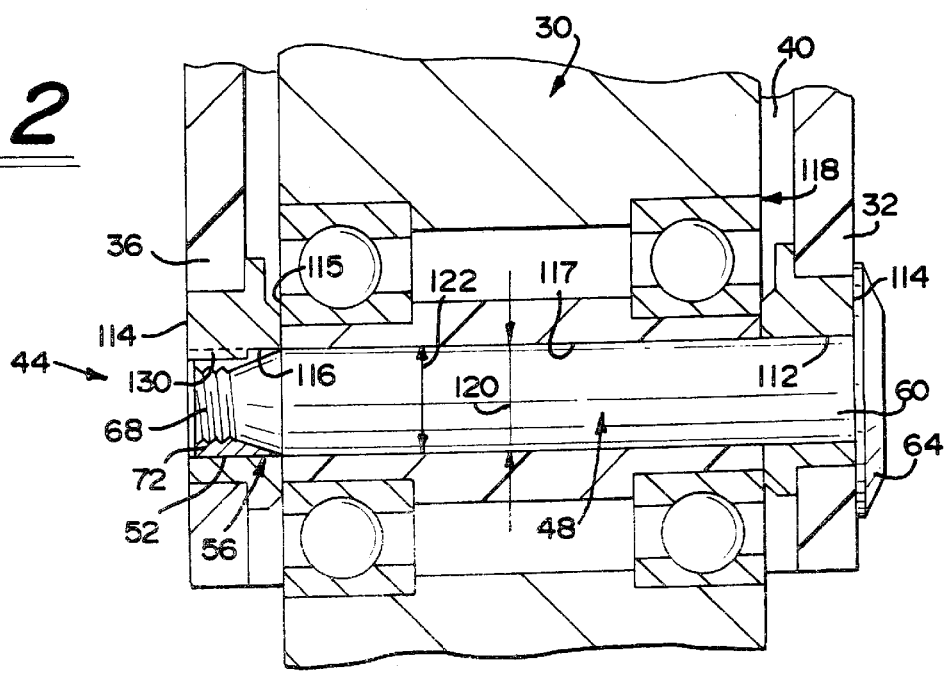
FIG. 2 is an enlarged, partial fragmentary, cross-sectional, elevational view of a wheel assembly and a portion of the frame taken along line 2—2 in FIG. 1 showing a novel fastener system of the present invention with a fastener engaged with an expandable nut to retain a wheel assembly on the frame of the skate.

With further reference to FIGS. 2–7, FIG. 2 is a partial fragmentary, cross-sectional side elevational view of a wheel assembly 30 which is retained in the channel 40 between the first and second side rails 32, 36 by the fastener system 44. Bushings 114 are provided in the embodiment as shown in FIGS. 2–7. As will be described in greater detail hereinbelow, the bushings 114 may be replaced or obviated but are found in many models of skates 20 for purposes of replacement and adjustment of wheel assemblies 30. As shown in FIG. 2, the fastener extends through a first axle aperture 112 defined by a bore in the bushing 114 with a portion of the shank 60 retained in the axle aperture 112. The nut 52 is inserted through the first axle aperture 112 and positioned in a second axle aperture 116 defined by a bore in a second bushing 114. A portion of the shank is positioned in an axle bore 117 in a bearing assembly 118 of the wheel, and provide an axle upon which the wheel 30 is mounted. The details of the bearing assembly 118 are not elaborated on herein and are of generally known construction.

It should be also be noted that an exterior dimension 120 of the shank 60 and the exterior dimension 108 of the non-expanded nut body 52 are generally equal and are equal to or slightly smaller than an interior dimension 122 of the axle bore 117 and the axle apertures 112, 116. These dimensional relationships allow the fastener system 44 to be attached to the first and second rails 32, 36 and through the wheel assembly 30 by axially inserting the nut body 52 attached to the fastener 48 through the first axle aperture 112, through the sleeve bore 126, and into the second axle aperture 116. This assembly eliminates the need to thread the fastener 48 onto the nut 52 which can be a complicated, time-consuming and unreliable process.

Additionally, a key 130 is provided in the second axle aperture 116. The key 130 is received in the slot 78. Engagement of the key 130 in the slot 78 prevents rotation of the nut body 52 relative to the second side rail 36 upon rotating the fastener 48 in the nut body 52, yet permits the nut 52 to expand into engagement with the bore. The key 130 is sized and dimensioned smaller than the slot 78 to minimize binding between the two structures when the nut 52 is engaged with the key 130.

As shown in FIG. 2, the fastener system 44 has been attached to the first side rail 32, the second side rail 36, extending through the wheel assembly 30. The fastener 48 has been rotated 90° relative to the nut body 52 thereby forcing the fastener tapered surface 98 into expansive engagement with the nut tapered surface 102. Engagement of the nut spreading structures 56 results in spreading or expanding of the nut 52 creating a compressive, frictional engagement between the exterior surface 82 of the nut 52 and an internal surface of the second axle aperture 116. The drawings show a frictional engagement between the exterior surface 82 of the nut 52 and the internal surface of the aperture 116. It is envisioned that other forms of engaging structures such as mechanical interlocks may be employed with the nut 52 of the fastener/axle system 44 of the present invention. The drive structure 64 includes an enlarged head 136 which retains the fastener against a face 138 of the first side rail 132. FIG. 3 provides an exploded perspective view to further illustrate the tapered surfaces 102, 104 and the relationship of the key 130 to the slot 78.

Moving from FIG. 2 to FIG. 4, the drive structure 64 has been engaged and the fastener 48 has been rotated a nominal amount, for example, a quarter turn (approximately 90°) to disengage the nut spreading structures 56, thereby relieving the outward forces which engaged the exterior surface 82 of the nut with the interior surface of the axle aperture 116. Upon relieving the forces, the fastener system 44 may be withdrawn, axially, from the apertures 116, 112 and the axle bore 117. Withdrawal of the fastener system 44 is shown in FIG. 4.

This system 44 is convenient in that the nut 52 is threadedly retained on the fastener 48 thereby providing a captive component system which minimizes or eliminates the loss of components. Further, this system 44 is efficient because threading is not required each time the fastener 48 is inserted into the wheel frame 28. Using prior art fasteners, the fastener would have to be inserted through the appropriate apertures and then the nut would have to be threaded from the opposite side. This is time consuming and unnecessary in view of the novel improvements provided by the present invention.

Figure 18:
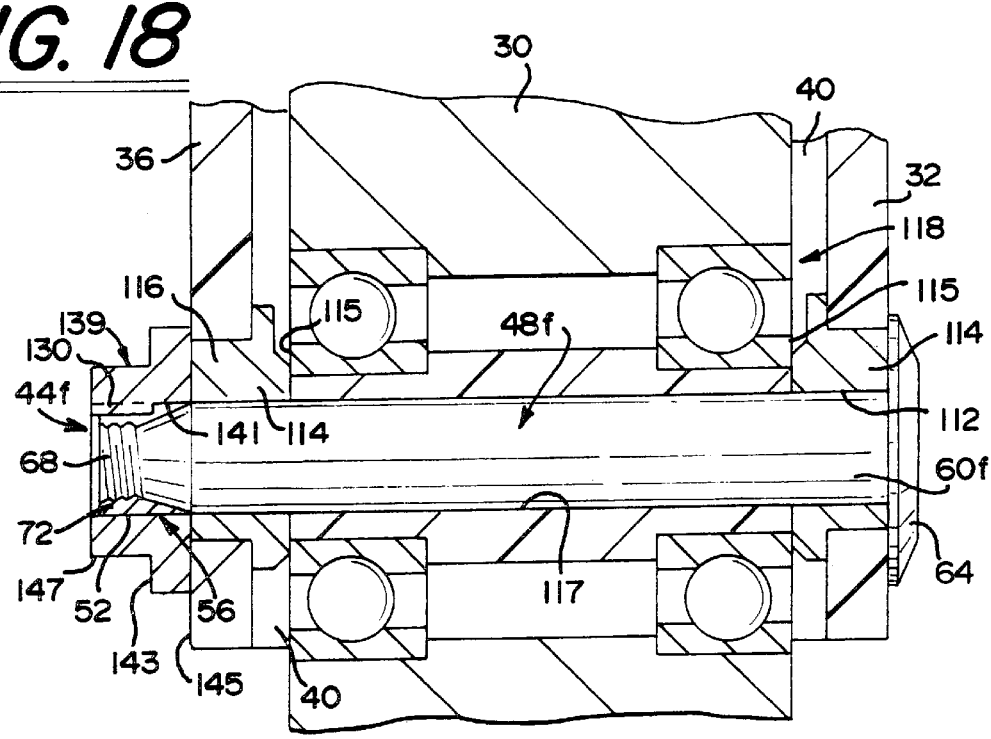
FIG. 18 is an enlarged, partial fragmentary, cross-sectional, elevational view of the wheel assembly and the portion of the frame similar to that as shown in FIG. 2 showing an alternate embodiment of the novel fastener system of the present invention using a receptacle positioned on the outboard side of the corresponding side rail with the fastener engaged with the expandable nut to retain the wheel assembly on the frame of the skate.

FIG. 18 shows an alternate embodiment of the invention which allows the fastener/axle system 44f to be used as a retrofitted assembly with an existing skate structure. In the embodiment as shown in FIG. 18, the system includes the fastener 48f, the nut 52 and a receptacle 139 which receives the nut 52. The receptacle 139 has a bore 141 which has a key 130 on the inside surface thereof. The nut 52 is engaged with the bore 141 with the slot 78 mating with the key 130 as described hereinabove. A flange 143 of the receptacle 139 overlies an outboard surface 145 of the side rail 36. The flange 143 provides positive abutment of the receptacle 139 against the side rail 36 which prevents axial removal of the fastener 44f, receptacle 139 and the bushing 144 through the side rail 36.

Figure 21:
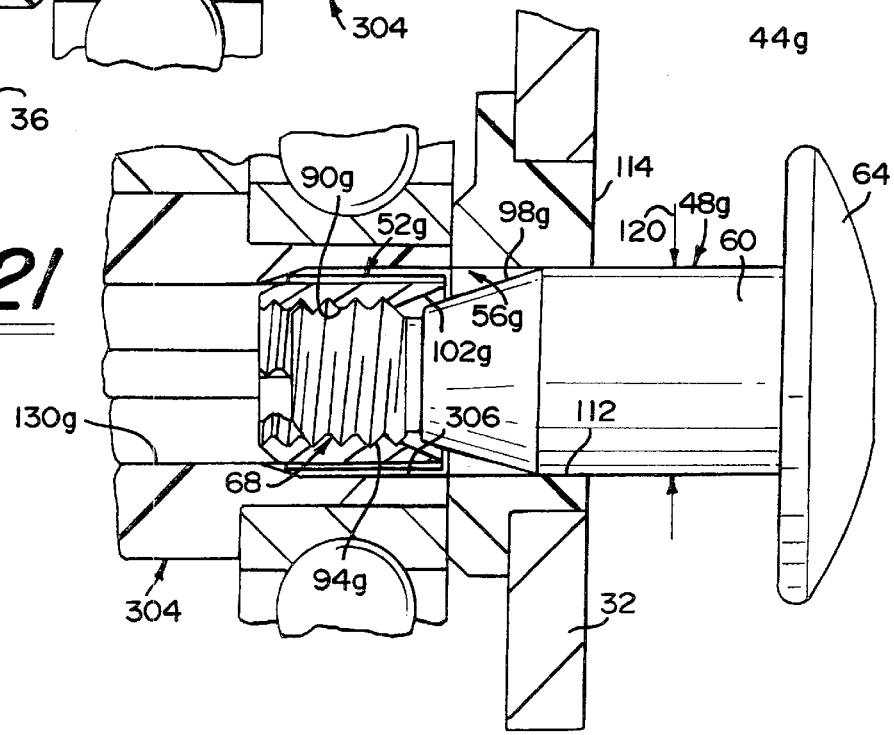
FIG. 21 is similar to FIG. 20 except that a fastener of the axle assembly has been rotated relative to an expanding nut body of the axle assembly to disengage the nut body from the bearing spacer for removal of the axle assembly from the bearing spacer.

The shank 60f of the fastener 48f is longer than the shank 60 of the fastener 48 shown in FIGS. 2–17 because the shank 60f must extend through the axle bore 117 and project beyond the outboard surface 145 of the side rail 36. By projecting beyond the side rail 36, the fastener system 44f may be used as a retrofitted assembly which can be used with existing bushings and wheel assemblies. In this regard the embodiment as shown in FIG. 21 does not require bushing having a key formed therein. The key in the embodiment in FIG. 18 is carried in the bore of the receptacle 139. An exterior surface 147 of the receptacle 139 is provided with a wrenching structure to receive and allow a wrenching tool to be engaged therewith. The fastener system 44f generally operates in the manner of the fastener system 44 as disclosed herein. The fastener 48f is inserted through the side wall 33, through the axle bore 117, through the side wall 36 with the nut 52 being inserted into the receptacle 139 upon aligning the key 130 in the slot 78. The fastener 48f is rotated to cause the nut 52 to be expanded with the outside surface of the nut 52 engaging the inside surface 141 of the receptacle 139.

Figure 8:
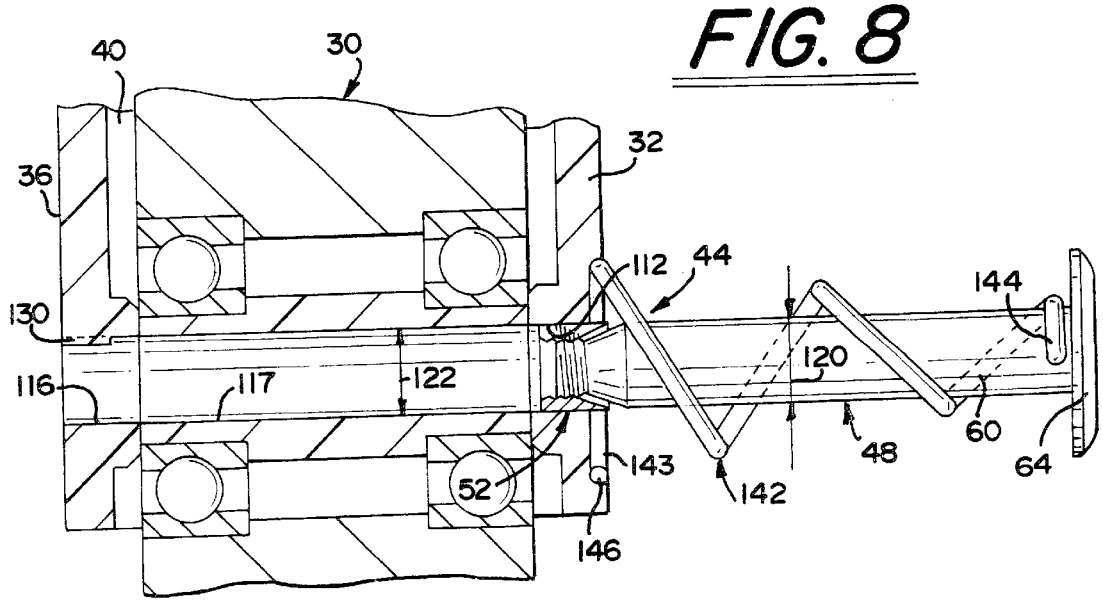
FIG. 8 is an enlarged, partial fragmentary, cross-sectional, elevational view of a captive conical nesting spring which is employed to disengage and retain a fastener and nut relative to a frame of an in-line skate.

Turning now to FIG. 8, an additional improvement is provided by the addition of a spring device 142 used with the fastener system 44 of the present invention. While a variety of spring devices or biasing devices 142 may be employed, a preferred embodiment of the spring device 142 is shown in FIG. 8 as a conical coiled compression spring. The spring 142 has outwardly positioned coils which allow the coils to nest in a recess 143 in the side rail 32 when the it is compressed providing a nominal profile. A first end 144 of the spring is attached to the shank 60 underneath the head 64. This retains the spring 142 as a captive piece on the fastener assembly 44. A second end 146 of the spring may be attached to the first side rail 32. Attachment of the spring to both the fastener and the side rail results in the fastener assembly 44 being a captive piece of hardware on the wheel frame 28.

The spring 142 is designed with a spring constant which, upon releasing rotation of the fastener, eject or removes the fastener system 44 from the second axle aperture 116 and the axle bore 117. As such, the spring constant will remove the fastener system 44 thus allowing removal of the wheel from the channel while still retaining the fastener system 44 on the wheel frame 28. The advantages of this captive arrangement are that none of the components can be removed from the wheel frame 28 in regular use. As such, use of the spring 142 with the fastener system 44 allows for quick and efficient removal and replacement of wheels on the wheel frame 28.

Figure 9:
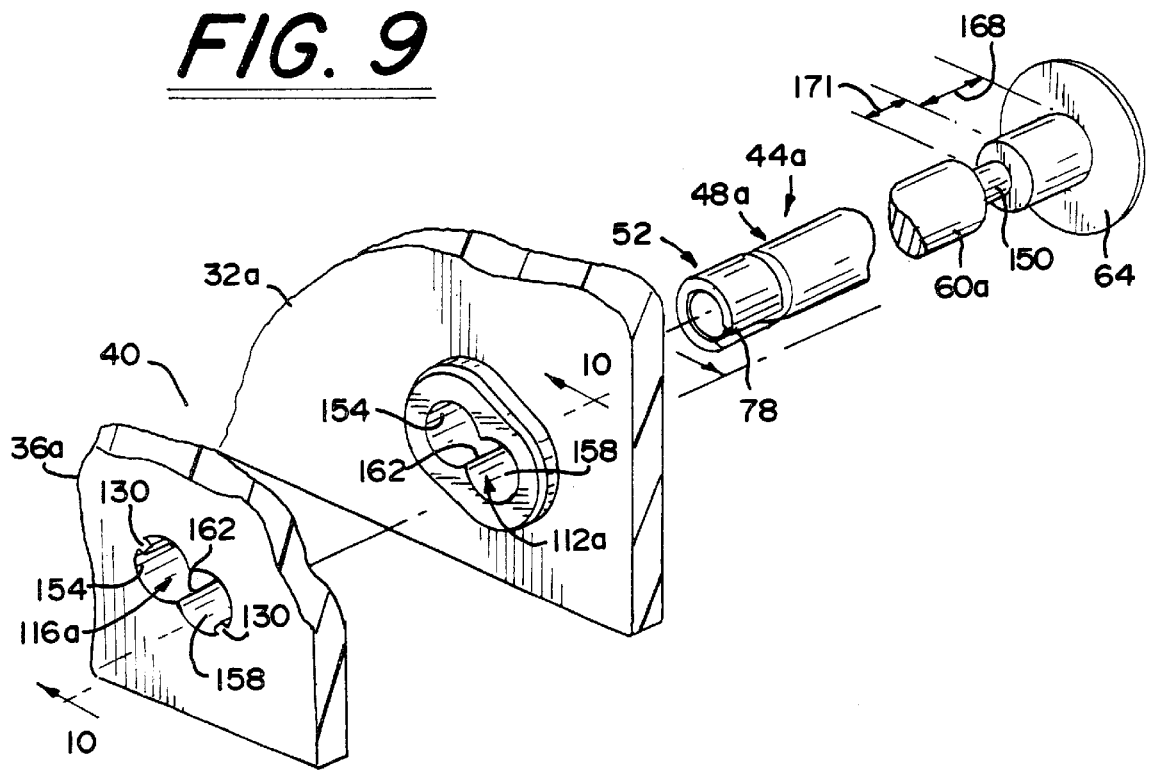
FIG. 9 is an enlarged, partial fragmentary, perspective view of an embodiment of the present invention which is used in a "rockering" system for adjusting in-line skate wheels.
Figure 10:
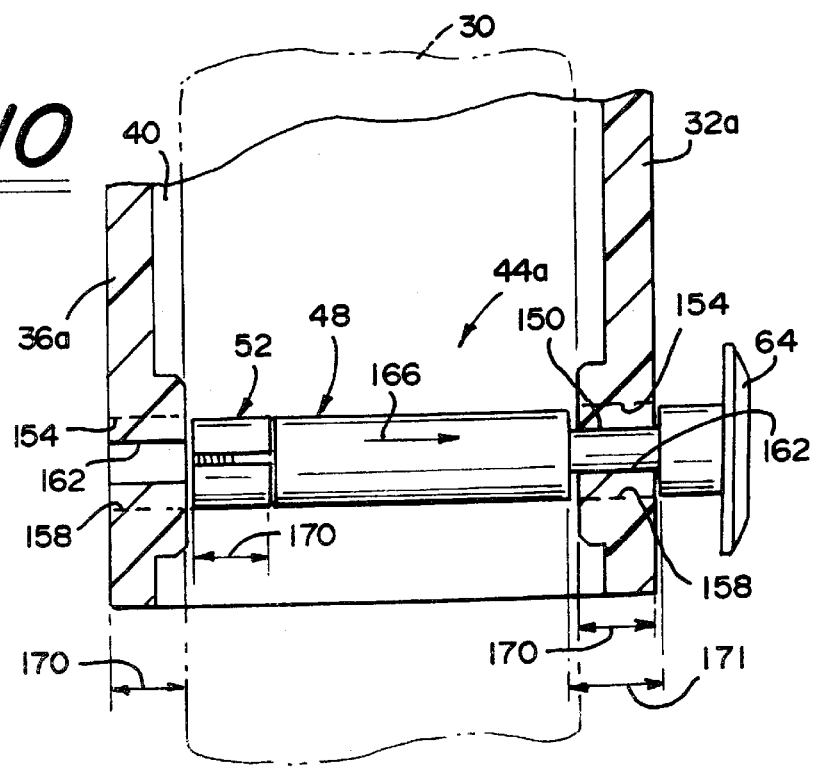
FIG. 10 is an enlarged, partial fragmentary, cross-sectional, elevational view of the fastener assembly as used in the "rockering" system shown in FIG. 9 showing an annular groove on the fastener positioned in a corresponding bore for adjusting the position of a wheel (shown in phantom line) associated therewith.

FIGS. 9 and 10 provide an alternate embodiment in which identical structures as those described in FIGS. 1–7 are represented by the same reference numerals and variations or alternate embodiments of the structures are represented by the same reference numerals with the addition of an alphabetic suffix, for example, fastener system 44a. As shown in FIGS. 9 and 10, the fastener system 44a is nearly identical to the fastener system 44 shown in FIGS. 1–7. In FIGS. 9 and 10, an annular groove 150 is provided on the shank 60a at a location spaced away from the head 64. Also, the first and second axle apertures 112a, 116a are formed with two chambers, an upper chamber 154 and a lower chamber 158. The upper and lower chambers 154, 158 are essentially overlapping bores in the first side rail and second side rail 32a, 36a. The overlapping area creates a reduced diameter dimension passage 162. The upper and lower chambers 154, 158 of the second axle aperture 112a include keys 130 sized for engaging the slot 78 of the nut 52.

The alternate embodiment as shown in FIGS. 9 and 10 allow the wheels which are attached to the wheel frame 28 to be "rockered". Rockering allows adjustment of individual wheels relative to the frame for a variety of purposes such as approximating a hockey style skate surface or for distributing loads. An example of an rockering structure as shown in the prior art, can be found in U.S. Pat. No. 5,028,058, issued Jul. 2, 1991 in the name of Olson. The rockering assembly as shown in Olson '058 includes plugs or bushings which include eccentric axle mounting bores. The plugs can be inverted to change the position of the bores thereby changing the position of the wheel within the frame. Additionally, while the bushings 114 are integrally formed in the side rails 32a 36a, it is envisioned that the chambers 154, 158 as taught hereinabove may also be formed in removable bushings as shown in FIGS. 2–7.

While the device as shown in Olson '058 is useful for adjusting the wheels, it may be a time consuming and somewhat difficult process. The present invention allows for quick and efficient changing of the wheel adjustments. In the present invention, the fastener assembly 44a is inserted through the desired chamber 154, 158 of the first axle aperture 116a to position the nut 52 in the corresponding chamber 154, 158 of the second axle aperture 112a. The key 130 is engaged in the slot 78.

By way of example, moving the fastener assembly 44a from the lower chamber 158 to the upper chamber 154 to adjust the wheel upwardly in the frame is an efficient and uncomplicated process. First, the fastener 48a is rotated approximately one quarter turn, in accordance with the teachings as set forth hereinabove, to disengage the nut spreading structures 56. The fastener 48a with the nut 52 attached thereto is extracted generally axially (as indicated by direction arrow 166). The extraction is continued to a point where the annular groove 150 is aligned with the passage 162 in the first axle aperture 116a (see, FIG. 10). The position of the annular groove 150 along the shank 60 is at a dimension 168 which is approximately equal to a length dimension 170 of the nut 52 and the width 170 of the side rail 36a. Further, the length 171 of the groove 150 is slightly larger than the width 170 of the side rail 32a. As such, the groove 150 is aligned with the passage 162 at a position at which the nut 52 clears and is completely disengaged from the second axle aperture 112a.

With the fastener system 44a thus positioned, it is moved through the passage 162 to a position in the upper chamber 154. The slot 78 is aligned with the key 130, whereupon the fastener 48a and nut 52 can be inserted into the upper chamber 154 of the second axle aperture 112a. Once the nut 52 is positioned in the upper chamber 154, the fastener 48a is rotated approximately a quarter turn to once again engage the nut spreading structures 56 thereby spreading the nut 52 to retain the nut 52 in the upper chamber 154.

The generally diagonal orientation of the upper chamber 154 relative to the lower chamber 158 provides advantages in retaining the fastener assembly 44a in the axle apertures 112a, 116a. For example, the apertures 112a, 116a support the fastener supporting the fastener assembly and the wheel attached thereto against upward and downward forces. Additionally, lateral forces are clearly and completely supported in at least one direction relative to each of the chambers 154, 158. Moreover, even lateral forces directed from each of the chambers 154, 158 towards the passage 162 are nearly completely supported as a result of the upper rim 174 and lower rim 178 associated with each passage 162.

Figure 7:
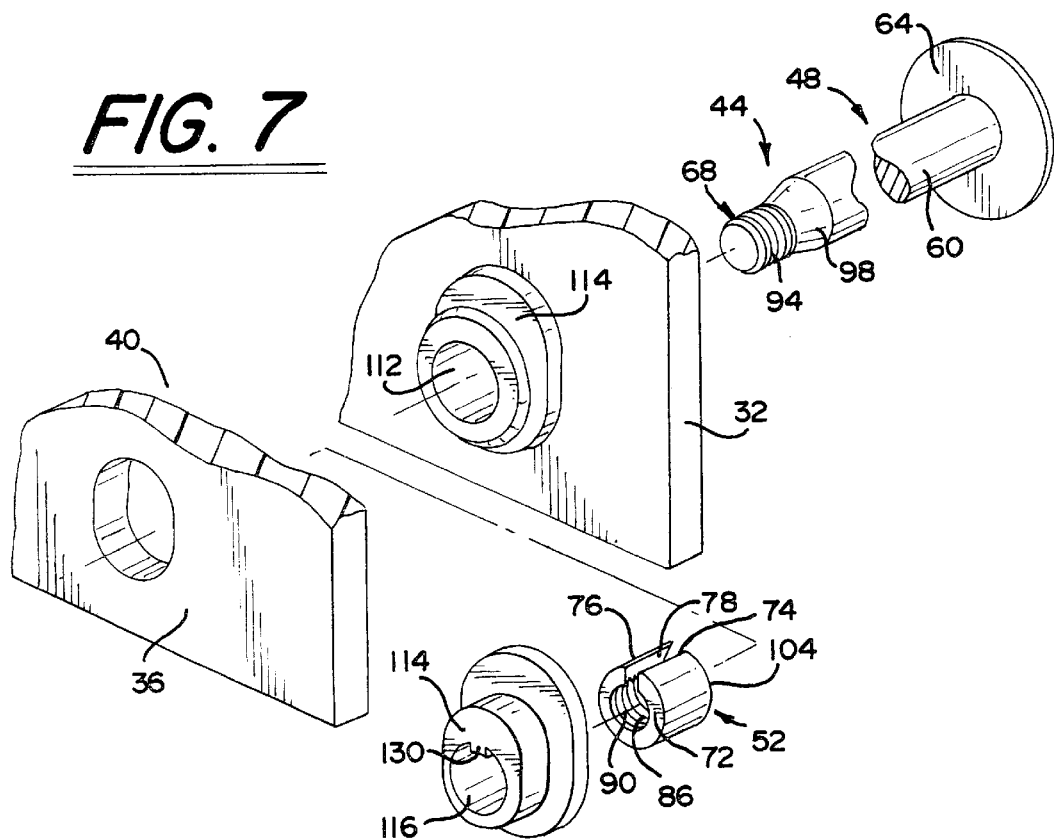
FIG. 7 is an enlarged, partial fragmentary, exploded, perspective view of the fastener system of the present invention as used with a wheel assembly as shown in FIG. 1 further illustrating a corresponding portion of the frame, insert bushings, and the fastener assembly.

It should be noted that the spring 142 discussed hereinabove may be employed with the adjustment structures as set forth in FIGS. 6 and 7. In fact, the spring would be highly applicable in the adjustment configuration to limit the degree of extension of the fastener from the apertures 112a, 116a. In order to use the spring in the embodiment as shown in FIGS. 6 and 7, the spring constant of the spring and the overall dimensions must be selected so that a desired degree of extension is achieved. One having ordinary skill in the art employing the teachings of the present invention is believed to be able to determine the necessary spring constant in order to disengage, for example, only the nut 52 from the second axle aperture 112a.

Figure 11:
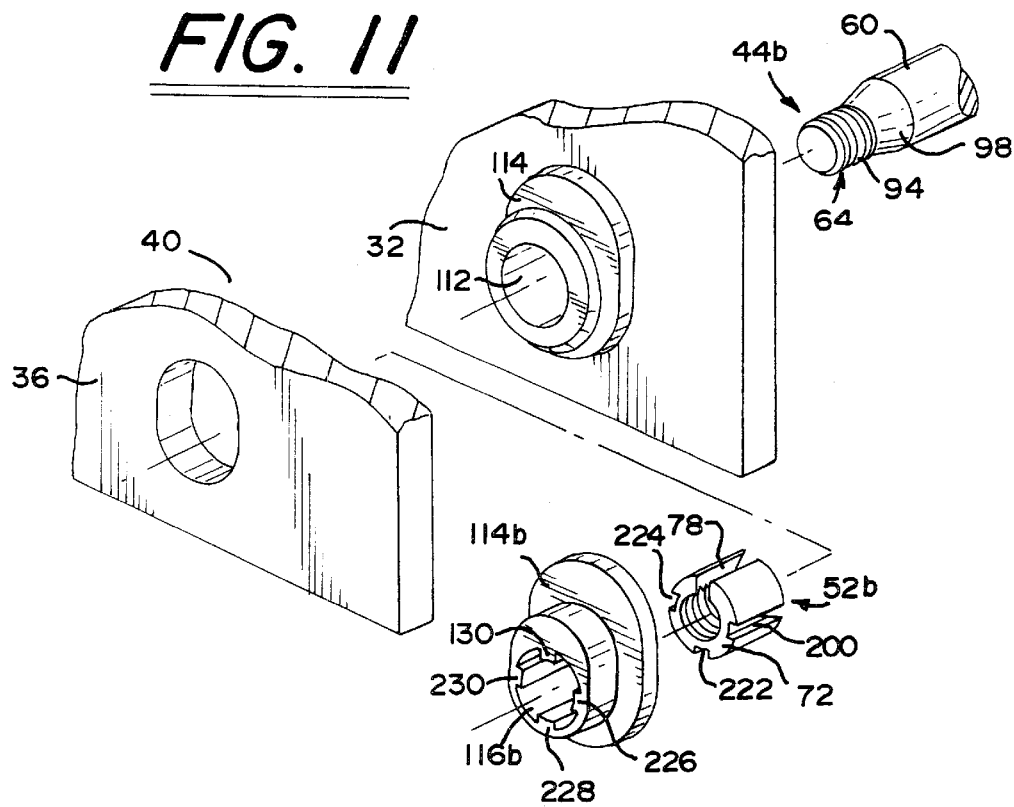
FIG. 11 is an enlarged, partial fragmentary, exploded, perspective view of the fastener system of the present invention similar to that as shown in FIG. 7 in which the fastener system employs a nut having four slots formed in an outside surface thereof.
Figure 12:
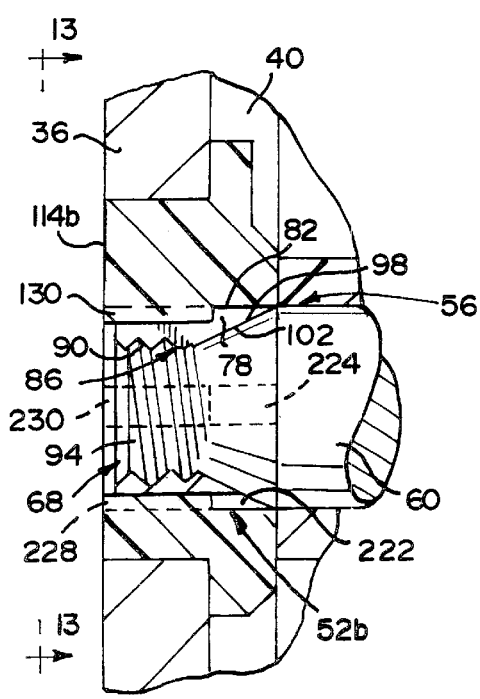
FIG. 12 is an enlarged, partial fragmentary, cross-sectional, elevational view of the threaded portion of the fastener engaged with the nut of FIG. 11 showing the position of three of the slots which are engaged by corresponding keys formed in the bore of the bushing.
Figure 13:
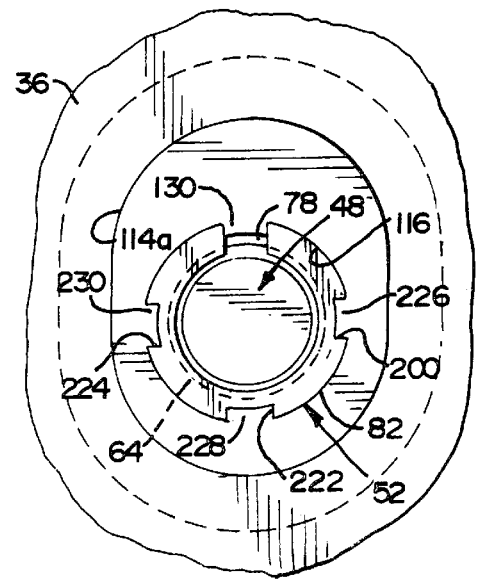
FIG. 13 is an elevational view taken along line 13—13 in FIG. 12 showing the arrangement of the nut with four slots engaged with the corresponding keys when the fastener is threadedly engaged with the nut.

FIGS. 11–13 show an alternate embodiment of the nut of the present invention. As shown in FIGS. 11–13, the structures which are identical to those as shown and described in preceding figures use the same reference numbers variations of the structures are shown using an alphabetic suffix, for example, the nut 52b.

Essentially, the difference between the nut 52b as shown in FIGS. 11–13 and the nut 52 as shown in FIGS. 1–7 is that the nut 52b includes a plurality of slots 78, 220, 222, 224. Correspondingly, a plurality of keys 130, 226, 228, 230 are provided in the axle bore 116b of the bushing 114b. The slot 78 and the corresponding key 130 provide the same engagement as shown in FIGS. 1–7. The slots 220, 222, 224 are different from the slots 78 in that they do not extend completely through the wall 72 of the nut body 52b. Generally, the keys 130, 226, 228, 230 are of identical dimension to allow engagement with any of the slots. As such, although the engagement of the slot 78 with the key 130 as shown in FIG. 13 is similar to that as shown in FIG. 6, the nut 52b may be rotated to allow engagement of the nut 52b in any orientation relative to the keys, for instance, engagement of the key 230 with the slot 78.

The purpose of the plurality of slots and keys is to allow the nut to be inserted, properly located and retained against rotation with little effort. While the nut structure 52 as shown in FIGS. 2–7 retains the nut 52 against rotation, it may require a rotation in order to locate the key 130 in the slot 78. As such, the embodiment as shown in FIGS. 11–13 allows one of the keys 130, 226, 228, 230 to be engaged with one of the slots 78, 220, 222, 224 upon rotation of no more than approximately 90°. The nut 52b with a plurality of slots helps to expedite the location of the nut in the bore 116b.

Figure 14:
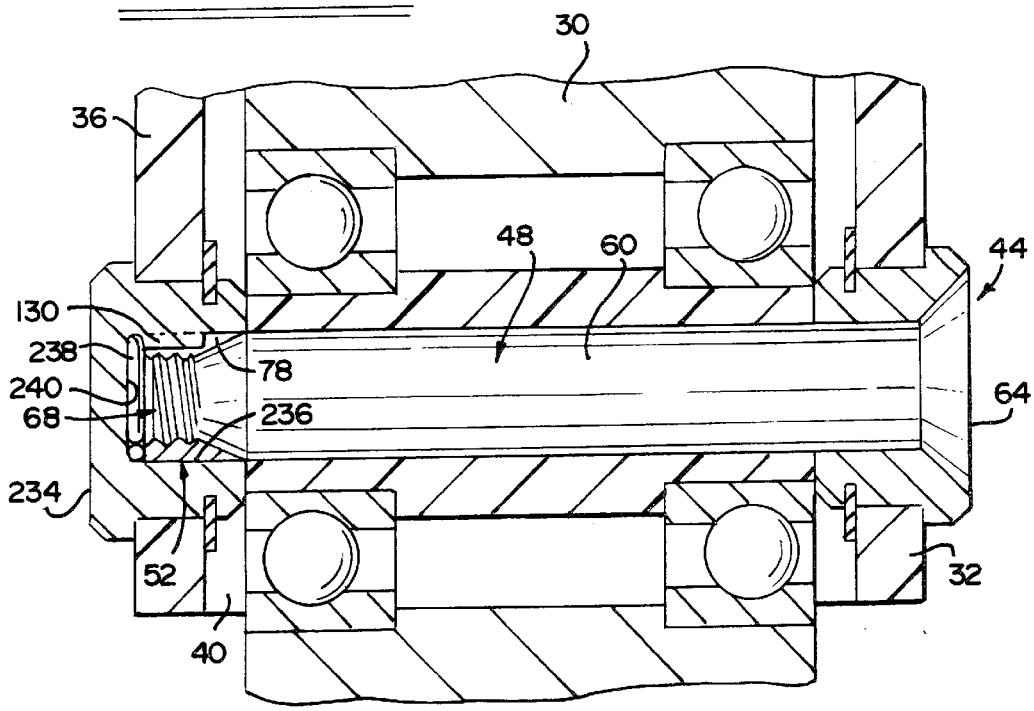
FIG. 14 is an enlarged, partial fragmentary, cross-sectional, elevational view of a nesting spring which is retained in one of the bushings to drive against the fastener and nut once the fastener and nut are disengaged to disengage the nut from the bushing and further showing the fastener and nut in the engaged configuration in which the spring is conically coiled in the bushing.
Figure 15:
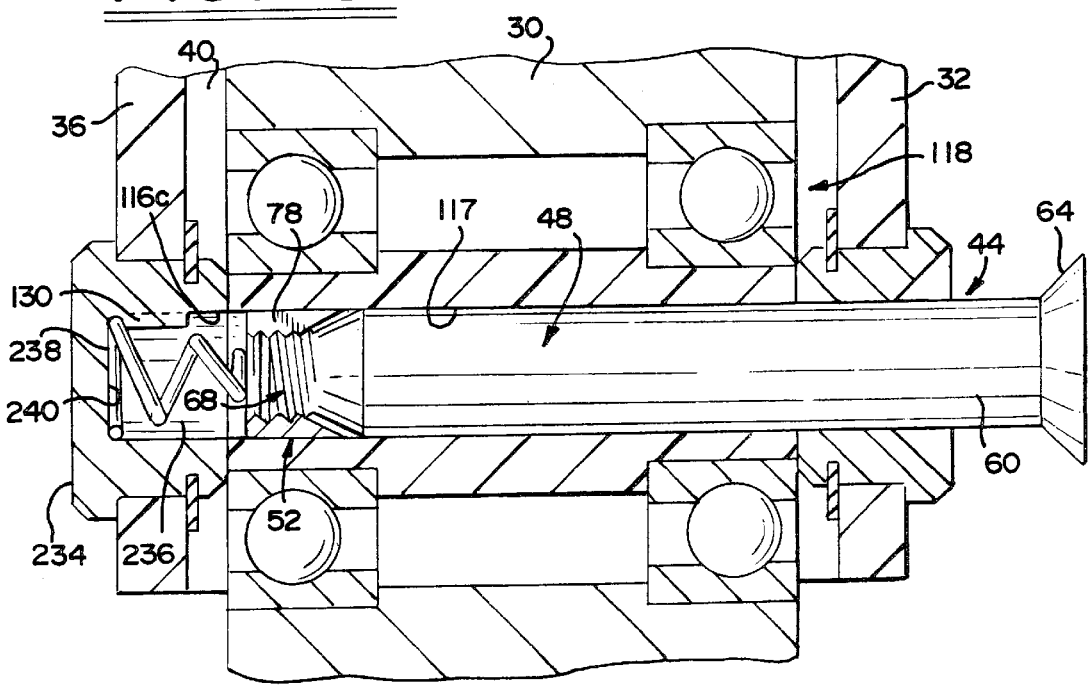
FIG. 15 is an enlarged view similar to FIG. 14 and in which the nut and fastener have been disengaged thereby allowing the spring to expand against the nut and fastener to axially displace the nut and fastener through the axle bore.

Turning now to FIGS. 14 and 15, another alternate embodiment of the present invention is shown. In the embodiment as shown in FIGS. 14 and 15, a bushing 234 is provided which defines a cavity 236. The cavity 236 defines an aperture 116c in which the nut 52 is retained and engaged to retain the fastener assembly 44 in engagement with the side walls 32, 36 and the wheel assembly 30. Additionally, a conical coiled spring 238 is positioned between an end wall 240 of the cavity 236 and the end of the nut 52 and fastener 48. The conical coiled spring 38 is coiled spirally inwardly on itself when the nut 52 is engaged in the bore 116c. When the fastener 60 is rotated a quarter turn, approximately 90°, relative to the nut 52, the forces are relieved between the nut 52 and the bore 116c thereby allowing the nut to be disengaged from the bore 116c. The spring 238 is provided with a spring constant of sufficient force to push the released fastener assembly generally axially along and through the axle bore 117.

The coiled spring 238 assures that the skate user will notice that the fastener 48 is extending from the side rail 32 thereby providing a fail safe mechanism. Additionally, the spring 238 helps to eject or remove the fastener assembly 44 from the frame and wheel assembly 30 once disengaged therefrom thereby facilitating easier removal of the fastener assembly 44.

Figure 16:
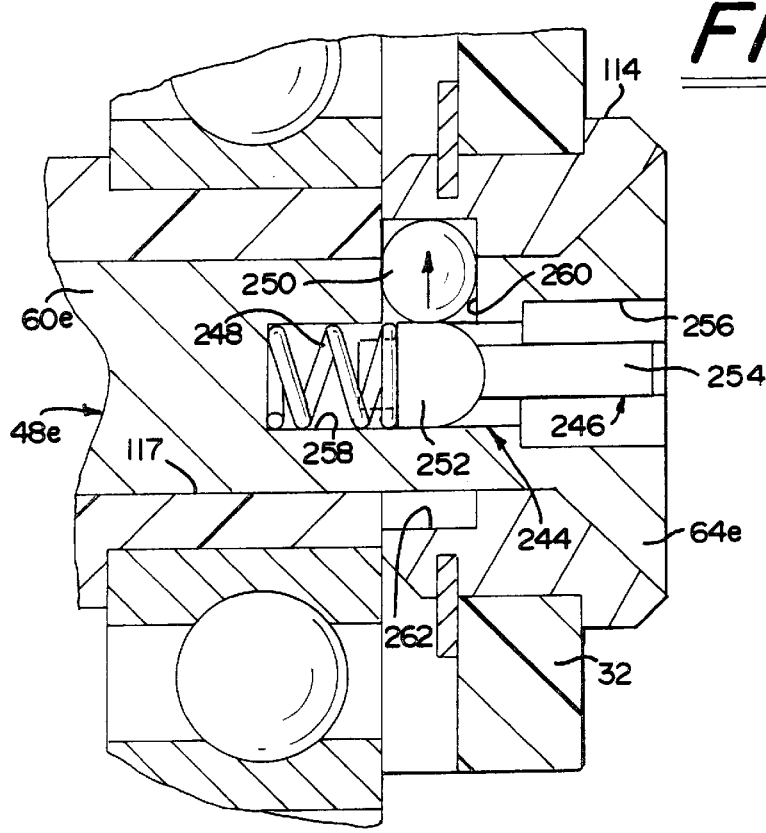
FIG. 16 is an enlarged, partial fragmentary, elevational view of a ball detent assembly of the fastener assembly of the present invention in which a ball is engaged with a recess in a bushing to retain the fastener and nut in engagement through the axle bore to prevent disengagement of the fastener system from the axle bore in the event the fastener is not engaged or tightened with the nut.
Figure 17:
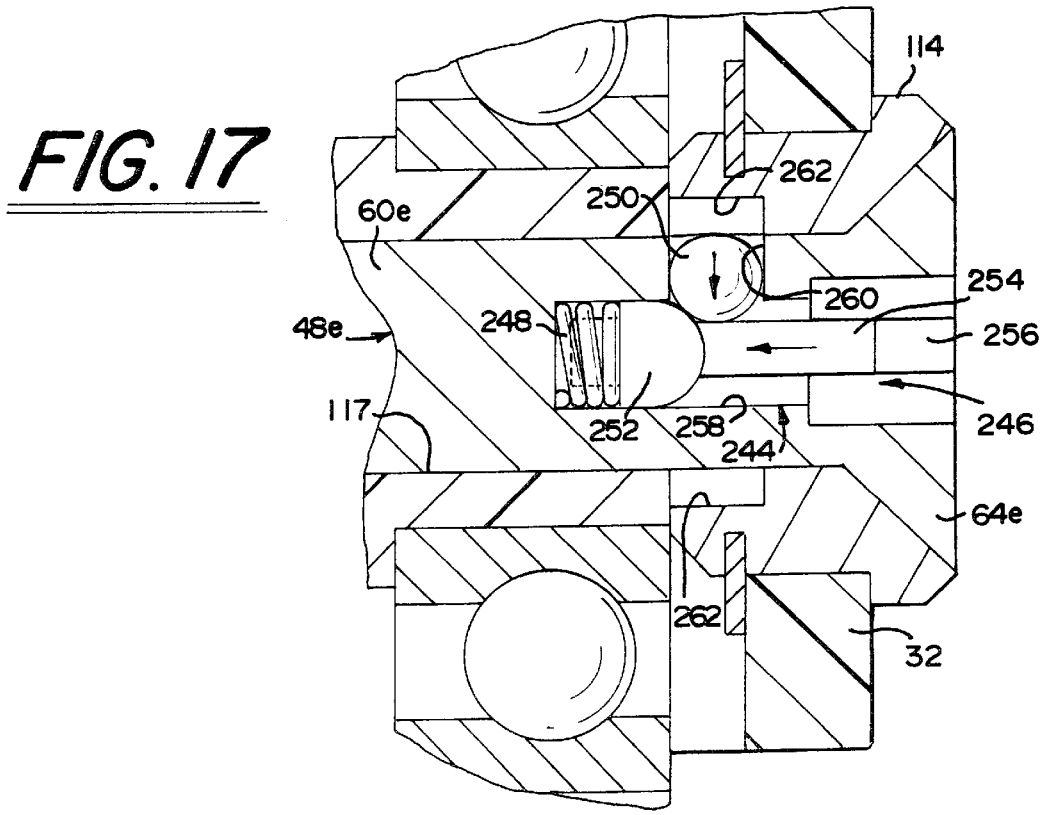
FIG. 17 is a view similar to that as shown in FIG. 16 in which the ball detent's assembly has been actuated to disengage the ball from the recess to allow the fastener system to be withdrawn from the axle bore.

FIGS. 16 and 17 show another alternate embodiment of the present invention which includes a ball detent assembly 244 which is disposed on the driving end 64e and a portion of the shank 60e of the fastener 48e. The ball detent assembly includes a plunger structure 246, a biasing spring 248 and an engaging ball 250. The plunger includes a ball moving portion 252 and a shaft portion 254. The shaft portion extends into a drive tool recess 256 formed in the head 64e of the fastener 48e.

The plunger assembly 246 is retained in a plunger bore 258 with the shaft extending from the bore 258 into the recess 256. The ball 250 is retained in a second bore 260 which communicates with the plunger bore 258. The spring 248 is retained between the ball moving body 252 in the bore 258.

It should be noted that the walls of the secondary bore 260 taper inwardly to retain the ball therein and prevent the ball from being removed therefrom. The ball 250, when extending from the bore 260, engages a recess 262 formed in the bushing 114. As shown in FIG. 16, the ball 250 is extended into the recess 262 to retain the fastener in engagement with the bushing 114 regardless of whether the nut (not shown in FIGS. 16 or 17 but shown in FIGS. 2–15) is engaged with the corresponding bushing. In other words, regardless of whether the fastener is rotated to cause the nut to expand thereby retaining the fastener assembly in axial alignment in the wheel assembly, the ball detent assembly 246 will retain the fastener assembly therein. This ball detent mechanism provides a fail safe mechanism to retain the fastener and prevent the wheel from becoming dislodged from the frame.

Turning to FIG. 17, the ball detent assembly has been disengaged such that the ball 250 is removed from the recess 262 and allowed to travel through the secondary bore 260 and partially into the bore 258. The ball 250 is disengaged from the recess 262 by axially displacing the shaft 254. Axial displacement of this shaft occurs when a tool (not shown in the interest of clarity) is inserted into the tool receiving recess 256. Upon inserting the tool the shaft and body 254, 252 compress the spring 248. Upon compressing the spring, the body 252 moves to the left (relative to FIG. 17) thereby providing clearance for the ball 250 to travel through the secondary bore 260.

Once the ball is disengaged, a slight canting action to the tool which is used to rotate the fastener 60e a quarter turn, will act to hold the fastener 60e from the axle bore 117. Additionally, the spring disengaging embodiment of the present invention employing the spring 238 as shown in FIGS. 14 and 15 may be used with this ball detent assembly. In this regard, once the ball 250 is disengaged from the recess 262, the spring 238 will act to axially displace the fastener assembly a sufficient distance so as to maintain the ball 250 in the disengaged position (as shown in FIG. 17).

FIGS. 19–23 show an embodiment of the axle system 44g of the present invention which includes a first axle assembly 300 and a second axle assembly 302. The axle assemblies 300, 302 extend through corresponding axle apertures 112, 116 respectively, inwardly towards each other and into a bearing spacer 304. The bearing spacer 304 defines an axle bore 117 which receives a portion of the first and second axle assemblies 300, 302 therein. The axle assemblies 300, 302 are operated to engage an inside surface 306 of the bore 117. As such, the first and second axle assemblies 300, 302 retain a wheel assembly 30 between the first and second side rails 32, 36 by engaging the bearing spacer 304 from opposite sides thereof As shown in the exploded perspective view of FIG. 23, the first axle assembly 300 includes a first fastener member 48g and an expandable nut body, expander, or nut 52g. Similarly, the second axle assembly 302 includes identical parts as the first axle assembly 300 including the fastener member 48g and the nut member 52g. Each fastener 48g includes a shaft 60, a drive structure 64, and threaded portion 68. Generally, the threaded portion 68 is formed on an end of the shaft 60 distal to the drive structure 64. The threaded portion 68 includes threads for threaded engagement with the nut 52g.

Each nut 52g is provided in the form of a single wall structure 72g having two ends 74g, 76g which are spaced apart forming a slot 78g therebetween. The slot 78g at least partially extends through the wall 72g, and in the preferred embodiment as shown, the slot 78g extends completely through the wall 72g. The wall 72g defines an exterior surface 82g and an interior surface 86g. Threads 90g are provided on the interior surface 86g to engage threads 94g on the threaded portion 68g of the fastener 48g. The nut 52g is adapted to be disposed in the bore 117g with the exterior surface 82g engaged with the surface portion of the bore 117g.

As further shown in FIGS. 19–23, displacement structures 56g are provided on the axle assemblies 300, 302 to provide mechanical advantage in translating rotary and axial forces into circumferential radial forces as described in greater detail hereinbelow. The displacement structures 56g as shown in FIGS. 19, 20, 21 and 23 include a nut tapered surface 102g on a leading end 104g of an interior surface 86g of the nut 52g and a fastener tapered surface 98g positioned on an exterior surface of the shank 60. Threads 90g, 94g are provided on the nut 52g and fastener 48g of each axle assembly 300, 302 for axially displacing and engaging the nut and fastener 52g, 48g for engaging and disengaging the displacement structures 56g. Operation of the threads 90g, 94g deforms and releases the wall 72g of the nut 52g and displaces the opposed edges 74g, 76g of the wall 72g.

Other embodiments of a fastener system have been illustrated and described hereinabove. The structure and function of the present embodiment of each axle assembly 300, 302 is substantially similar to and works on substantially the same principle as the other embodiments of the novel fastener systems 20 set forth hereinabove. The general principles are that the fastener 48g and nut 52g operate by using threads 90g, 94g to engage displacement structures 56g to radially deform the wall 72g of the nut 52g. The tapered surface 102g on the nut 52g is engaged by the fastener tapered surface 98 upon rotation of the fastener 48g relative to the nut 52g. Outward radial expansion of the nut 52g upon continued engagement of the displacement structures 56g cause the nut 52g to frictionally engage the interior surface 306 of the bearing spacer 304. As shown in FIGS. 19, 20, 21 and 23, the threads 90g, 94g include the external thread 94g formed on the leading end of the shank 60g and internal thread 90g formed on the interior surface 86g of the nut 52g. The external and internal threads 94g, 90g are engaged to bring the tapered surfaces 98g and 102g into close position. Rotation or engagement of the fastener 48g in the nut 52g results in engaging the tapered surfaces 98g, 102g to produce a circumferential, radially outwardly expansion force on the nut 52g.

The external diameter 120g of the shank 60g of the fastener 48g (see FIG. 21) is substantially equal to or greater than the external diameter 108g (see FIG. 22) of the nut 52g in a relaxed or unexpanded condition. In this configuration, the nut 52g and fastener 48g are easily inserted into the apertures 112, 116 of the bushings 114 retained in the side rails 36, 32. Engagement of the tapered surfaces 98g, 102g will result in increasing the diameter of the nut 52g. The expansion mechanism of the displacement structures 56g generally outwardly radially expand the nut 52g to create circumferential expansion forces which frictionally engage an exterior surface of the nut with an interior surface 306 of the bearing spacer 304.

The threads 90g, 94g are sized and dimensioned for engaging the fastener tapered surface 98g with the nut tapered surface 102g upon a 90° rotation of the fastener 48g relative to the nut 52g. This 90° rotation or quarter-turn of the fastener 48g relative to the nut 52g helps promote quick and easy engagement and disengagement of each axle assembly 300, 302 from each side of the skate.

Figure 20:
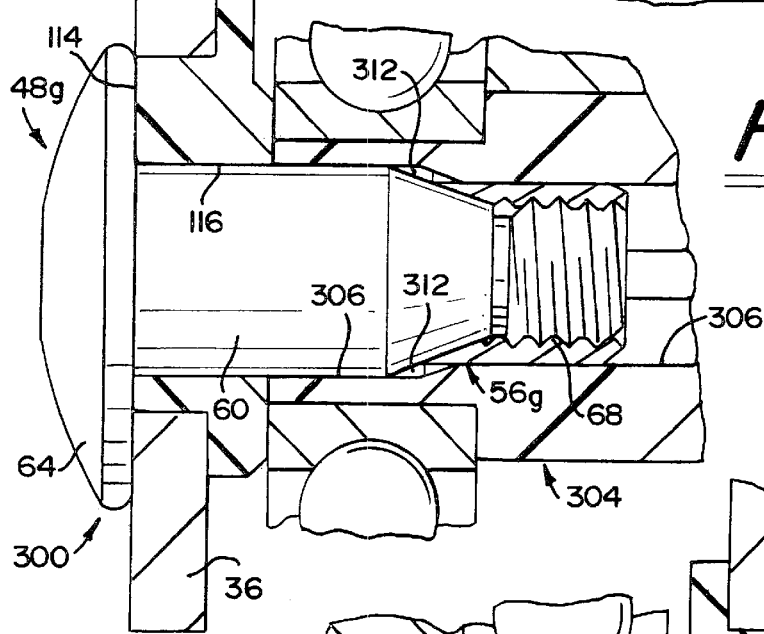
FIG. 20 is an enlarged, partial fragmentary, cross-sectional, side elevational view of one axle assembly such as shown in FIG. 19 engaged with the bearing spacer.

To further facilitate ease of engagement and disengagement, alignment structures 308 are provided on the nut and in the bore. The alignment structures 308 as shown in the figures include at least one spline 130g positioned in the bore 117 for engagement with at least one corresponding channel 310 on the nut 52g. As shown, four splines 130g are provided at spaced-apart locations inside the bore 117 of the bearing spacer 304. Similarly, four spaced-apart channels 310 are provided on the outside surface of the nut 52g for engagement therewith. As shown in FIG. 20, the splines 130g are sized and dimensioned to prevent interference with the engagement of the tapered surfaces 98g, 102g. Further, a small gap 312 is formed between the splines 130g and the fastener 48g in order to prevent the fastener 48g from "bottoming out" or otherwise being limited in its axial displacement in the bore 117 by the spline 130g.

In use, the axle assemblies 300, 302 of the present invention are assembled by threading the nut 52g onto the fastener 48g to a point before abutment and engagement of the displacement structures. Each axle assembly 300, 302 is engaged with the skate by axially positioning the axle assembly through the aperture 112, 116 in the bushing 114 retained on the corresponding side rail 32, 36 and further extending the nut 52g retained on the end of the fastener into the corresponding end of the bore 117 in the bearing spacer 304. As the nut 52g is axially positioned in the bore 117 of the bearing spacer 304, the nut 52g is positioned to align and engage the splines 130g in the corresponding channels 310. The engagement of the splines 130g with the corresponding channels 310 prevents rotation once the fastener 48g is rotated relative to the nut 52g. Rotation of the fastener 48g in the nut 52g causes the tapered surfaces 98g, 102g to engage. Continued rotation of the fastener 48g in the nut 52g further operates the threads 90g, 94g increasing circumferential outward radial forces between the exterior surface of the nut 52g and the interior surface of the bore 117. Removal of each axle assembly 300, 302 from the corresponding opposite ends of the bore 117 is similarly quick and efficient. Rotation of the fastener 48g to operate the threads 94g to disengage the displacement structures 56g relieves the forces from the nut 52g. Disengagement of the tapered surfaces 98g, 102g removes the stress placed on the wall 72g which created the frictional engagement between the exterior surface of the nut and the interior surface 306. Once the circumferential outward radial forces have been sufficiently relieved, the entire axle assembly 300, 302 may be axially removed or withdrawn from the corresponding end of the bore 117 in the bearing spacer 304.

Figure 19:
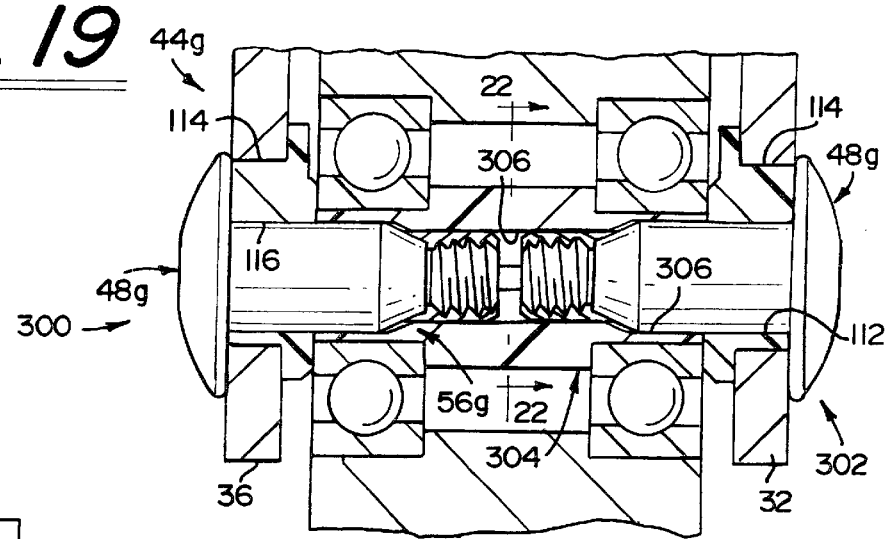
FIG. 19 is an enlarged, partial fragmentary, cross-sectional, side elevational view of a wheel assembly and portion of the frame taken along line 19—19 in FIG. 1 showing a novel axle system of the present invention with a pair of axle assemblies engaged with a bearing spacer to retain a wheel in relation to the frame of the skate.

The present invention is sensitive to a variety of frame or chassis widths. In other words, because two axle assemblies 300, 302 are used, they can accommodate a variety of axle and bearing spacer widths. More specifically, each axle assembly 300, 302 is inserted from opposite sides of the frame. As shown in FIG. 19, the tips of the axle assemblies 300, 302 are spaced apart inside the bearing spacer 304. The two axle assembly structure of the present axle system 44g can accommodate a range of chassis widths. For example, the tips of the axle assemblies 300, 302 may be spaced 3/16 of an inch apart or even more. As such, the axle system 44g of the present invention may be used with a wide variety of skate systems thus providing a broader range of applications for the present axle system than prior art single axle nut and bolt systems.

Figure 24:
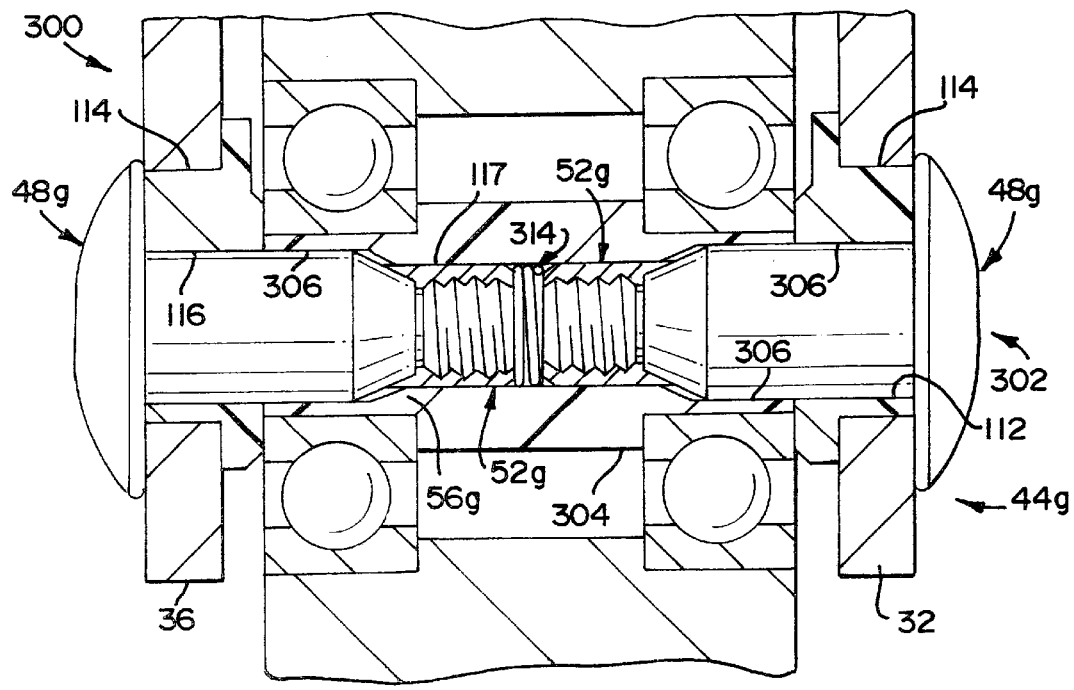
FIG. 24 is a partial fragmentary, cross-sectional, side elevational view similar to FIG. 22 and further including a compression spring retained in the bearing spacer between the axle assemblies to axially disengage the axle assemblies from the bore when the nut is released from engagement with the bearing spacer.

With further reference to FIG. 24, the present invention including the two axle assemblies 300, 302 may be provided with a compression spring 314 positioned therebetween. The compression spring 314 is positioned inside the bore 117 in the bearing spacer 304. The compression spring pushes the axle assemblies 300, 302 axially outwardly when the nut 52g is released from engagement from the inside surface 306 of the bearing spacer 304.

The spring as used in the embodiment as shown in FIG. 24 is similar to that as used in the embodiment as shown in FIGS. 14 and 15. The spring may be coiled and nested on either end with a central coil being sized and dimensioned to retain the spring within the bore 117. As such, the spring will not interfere with the positioning and engagement of the axle assemblies 300, 302 but will provide the disengaging feature as described hereinabove.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. An axle system for retaining a wheel assembly on a skate having a frame including spaced apart first and second side rails defining a channel therebetween, at least one wheel assembly defining a wheel axle bore therein, said first and second side rails having oppositely positioned axle apertures corresponding to each wheel assembly, said axle system comprising:

a first fastener and second fastener, each of said first and second fasteners having a shank, a driving structure on one end of said shank and a threaded portion on said shank generally opposite said driving structure;

a first nut body engaged with said first fastener and a second nut body engaged with said second fastener, each of said first and second nut bodies having a wall defining an inside surface and an outside surface, said wall having axially disposed opposed edges defining a slot at least partially extending therethrough;

nut expanding structures on each of said first and second fasteners and said first and second nut bodies, said nut expanding structures on said first and second fasteners, respectively, independently, expanding said first and second nut bodies;

said first fastener with said first nut body attached thereto extending through said axle aperture of said first side rail with said first nut body positioned in said axle bore of said wheel assembly and said second fastener with said second nut body attached thereto extending through said axle aperture of said second side rail with said second nut body positioned in said axle bore of said wheel assembly opposite said first fastener and said first nut body, said first and second nut bodies being selectively engaged and disengaged in said axle bore of said wheel assembly.

2. An axle system for retaining a wheel assembly on a skate as recited in claim 1, further comprising:

alignment structures on said outside surface of said nut and on an internal surface of said wheel axle bore for preventing rotation of said nut bodies relative to said wheel axle bore upon rotation of each of said fasteners relative to corresponding ones of said nuts.

3. An axle system for retaining a wheel assembly on a skate as recited in claim 2, said alignment structures further comprising:

at least one spline on said internal surface of said wheel axle bore for engagement with both of said first and second nut bodies, said spline being received in said slot in each of said first and second nut bodies for preventing rotation of said first and second nut bodies upon rotation of said first and second fasteners.

4. An axle system for retaining a wheel assembly on a skate as recited in claim 1, further comprising:

a bearing spacer retained in a wheel body of said wheel assembly, said bearing spacer defining said wheel axle bore, a central axis extending through said bearing spacer, alignment structures on said outside surface of said nut and on an internal surface of said wheel axle bore, said alignment structures being generally parallelly aligned with said central axis, said alignment structures preventing rotation of each of said first and second nut bodies relative to said bore upon rotation of corresponding ones of said first and second fasteners relative to said first and second nut bodies.

5. An axle system for retaining a wheel assembly on a skate as recited in claim 1, further comprising:

each of said first and second nut bodies being sized and dimensioned for disposition in said wheel axle bore and for engagement therein, said wall of each of said first and second nut bodies having an entry end for receiving at least said threaded portion of said fastener, an inside surface of said wall being threaded for receiving said threaded portion of said fastener to provide a mechanical advantage in expanding each of said nut bodies in said wheel axle bores.

6. An axle system for retaining a wheel assembly on a skate as recited in claim 1, said nut expanding structures further comprising:

a fastener tapered surface on each of said first and second fasteners between said threaded portion and said shank, said fastener tapered surface tapering from said shank inwardly towards said threaded portion; and a nut tapered surface on a corresponding end of each of said first and second nut bodies, said nut tapered surface tapering outwardly from said inside surface of said nut body towards said corresponding end.

7. An axle system for retaining a wheel assembly on a skate as recited in claim 1, said slot of each of said nut bodies being formed in said outside surface of each of said nut bodies extending completely through said wall.

8. An axle system for retaining a wheel assembly on a skate as recited in claim 1, further comprising:

each of said first and second nut bodies having a plurality of spaced apart slots in said outside surface, one of said plurality of slots extending from said outside surface to said inside surface through said wall.

9. An axle system for retaining a wheel assembly on a skate as recited in claim 1, wherein a threaded portion on each of said first and second fasteners and threads in each of said first and second nut bodies being dimensioned for respectively engaging said fastener tapered surface and a nut tapered surface upon rotation of said fastener approximately 90° relative to said nut body.

10. An axle system for retaining a wheel assembly on a skate as recited in claim 1, wherein an external surface of each of said first and second nut bodies is sized and dimensioned for frictionally engaging an internal surface of said bore upon expanding said nut when positioned in said bore.

11. An axle system for retaining a wheel assembly on a skate as recited in claim 1, each of said axle assemblies further comprising:

a shank exterior dimension being at least equal to a nut body exterior dimension;

said first and second axle apertures having substantially equal interior dimensions which in turn are at least substantially equal to said internal dimensions of said wheel axle bore; and said first and second fasteners with said first and second nut bodies attached thereto being insertable through said first and second axle apertures of said first and second side rails, respectively, and into said wheel axle bore from opposite ends thereof, for positioning said first and second nut bodies in said wheel axle bore.

12. An axle system for retaining a wheel assembly on a skate having a frame including spaced apart first and second side rails defining a channel therebetween, said first and second side rails having oppositely positioned axle apertures corresponding to each wheel assembly, said axle system comprising:

a bearing spacer defining a wheel axle bore therein;

a first axle assembly extending through a corresponding axle aperture in said first rail and being positioned proximate to said bearing spacer for engaging an internal surface of said wheel axle bore in said bearing spacer for retaining said wheel assembly relative to said first rail; and a second axle assembly extending through a corresponding axle aperture in said second rail and being positioned proximate to said bearing spacer for engaging an internal surface of said wheel axle bore in said bearing spacer for retaining said wheel assembly relative to said second rail, said first and second axle assemblies further comprising:

a first fastener and second fastener of said first and second axle assemblies, respectively, each of said first and second fasteners having a shank, a driving structure on one end of said shank and a threaded portion on said shank generally opposite said driving structure;

a first nut body and a second nut body of said first and second axle assemblies, respectively, said first nut body attached to said first fastener and said second nut body attached to said second fastener, each of said first and second nut bodies having a wall defining an inside surface and an outside surface, and at least one slot extending at least partially through said outside surface of said wall;

nut expanding structures on each of said first and second axle assemblies, said unit expanding structures on said first and second axle assemblies, respectively, independently, expanding said first and second nut bodies;

said first fastener with said first nut body attached thereto positioned in and extending through said axle aperture of said first side rail with said first nut body positioned in said axle bore of said bearing spacer and said second fastener with said second nut body attached thereto positioned in and extending through said axle aperture of said second side rail with said second nut body positioned in said axle bore of said bearing spacer opposite said first fastener and said first nut body, said first and second nit bodies being selectively engaged and disengaged in said axle bore of said bearing spacer.

13. An axle system for retaining a wheel assembly on a skate as recited in claim 12, further comprising:

alignment structures on said outside surface of each of said first and second nut bodies and on an internal surface of said wheel axle bore for preventing rotation of said nut bodies relative to said wheel axle bore upon rotation of each of said fasteners relative to corresponding ones of said nuts.

14. An axle system for retaining a wheel assembly on a skate as recited in claim 13, said alignment structures further comprising:

at least one spline on said internal surface of said wheel axle bore for engagement with both of said first and second nut bodies, said spline being received in said slot in each of said first and second nut bodies for preventing rotation of said first and second nut bodies upon rotation of said first and second fasteners.

15. An axle system for retaining a wheel assembly on a skate as recited in claim 14, one of said at least one slots formed in said outside surface of each of said nut bodies extending completely through said wall.

16. An axle system for retaining a wheel assembly on a skate as recited in claim 14, further comprising:

each of said first and second nut bodies having a plurality of spaced apart slots in said outside surface, one of said plurality of slots completely extending through said wall.

17. An axle system for retaining a wheel assembly on a skate as recited in claim 12, said threaded portion on each of said first and second fasteners and said threads in each of said first and second nut bodies being dimensioned for respectively engaging said fastener tapered surface and a nut tapered surface upon rotation of a fastener approximately 90° relative to said nut body.

18. An axle system for retaining a wheel assembly on a skate having a frame including spaced apart first and second side rails defining a channel therebetween, said first and second side rails having oppositely positioned axle apertures corresponding to each wheel assembly, said axle system comprising:

a bearing spacer defining a wheel axle bore therein;

a first axle assembly extending through a corresponding axle aperture in said first rail and being positioned proximate to said bearing spacer for engaging an internal surface of said wheel axle bore in said bearing spacer for retaining said wheel assembly relative to said first rail; and a second axle assembly extending through a corresponding axle aperture in said second rail and being positioned proximate to said bearing spacer for engaging an internal surface of said wheel axle bore in said bearing spacer for retaining said wheel assembly relative to said second rail, an exterior dimension of said first and second axle assemblies being at least equal to the exterior dimension of said axle apertures;

said first and second axle apertures having substantially equal interior dimensions which in turn are at least substantially equal to said internal dimensions of said wheel axle bore; and said first and second axle assemblies being insertable through said first and seconds axle apertures of said first and second side rails, respectively, and into said wheel axle bore, for engaging an internal surface of said bearing spacer to retain said wheel assembly between said first and second rail.

19. An axle system for retaining a wheel assembly on a skate, having a frame including spaced apart first and second side rails defining a channel therebetween, said first and second side rails having oppositely positioned axle apertures corresponding to each wheel assembly, said axle system comprising:

a bearing spacer defining a wheel axle bore therein;

an expandable first axle assembly extending through a corresponding axle aperture in said first rail and being positioned proximate to said bearing spacer for engaging an internal surface of said wheel axle bore in said bearing spacer when said first axle assembly expands for retaining said wheel assembly relative to said first rail; and an expandable second axle assembly extending through a corresponding axle aperture in said second rail and being positioned proximate to said bearing spacer for engaging an internal surface of said wheel axle bore in said bearing spacer when said second axle assembly expands for retaining said wheel assembly relative to said second rail.

20. An axle system for retaining a wheel assembly on a skate as recited in claim 19, wherein each of said first and second axle assemblies includes a nut body which expands into contact with said internal surface of said wheel axle bore in said bearing spacer.

* * * * *

UNITED STATES PATENT AND TRADEMARK OFFICE
CERTIFICATE OF CORRECTION

PATENT NO. : 5,941,539
DATED : August 24, 1999
INVENTOR(S) : John D. Pratt

It is certified that error appears in the above-identified patent and that said Letters Patent is hereby corrected as shown below:

Column 2, Line 16 "rocketing" should read -- "rockering" --

Column 16, Line 60 "unit" should read -- nut --

Column 17, Line 6 "nit" should read -- nut --

Column 18, Line 18 "seconds" should read -- second --

Signed and Sealed this

Twenty-fifth Day of April, 2000

Attest:

Q. TODD DICKINSON

*Attesting Officer*

*Director of Patents and Trademarks*